(12) United States Patent
Chesnokov et al.

(10) Patent No.: US 10,044,952 B2
(45) Date of Patent: Aug. 7, 2018

(54) ADAPTIVE SHADING CORRECTION

(71) Applicant: Apical Ltd., Cambridge (GB)

(72) Inventors: Viacheslav Chesnokov, Loughborough (GB); Daniel Larkin, Nottingham (GB); Varuna De Silva, Leicester (GB); Sutirtha Deb, Leicester (GB)

(73) Assignee: APICAL LTD., Cambridge (GB)

( * ) Notice: Subject to any disclaimer, the term of this patent is extended or adjusted under 35 U.S.C. 154(b) by 0 days.

(21) Appl. No.: 15/265,637

(22) Filed: Sep. 14, 2016

(65) Prior Publication Data

US 2017/0078596 A1 Mar. 16, 2017

(30) Foreign Application Priority Data

Sep. 14, 2015 (GB) .................................. 1516173.0

(51) Int. Cl.
*H04N 5/357* (2011.01)
*H04N 9/64* (2006.01)
*H04N 9/77* (2006.01)

(52) U.S. Cl.
CPC .......... *H04N 5/3572* (2013.01); *H04N 9/643* (2013.01); *H04N 9/646* (2013.01); *H04N 9/77* (2013.01); *H04N 2209/047* (2013.01)

(58) Field of Classification Search
CPC ...... H04N 5/3572; H04N 5/217; H04N 9/045; H04N 9/643; H04N 9/77; H04N 9/646; H04N 2209/047
See application file for complete search history.

(56) References Cited

U.S. PATENT DOCUMENTS

| 8,406,557 | B2 * | 3/2013 | Park | H04N 5/3572 |
| | | | | 348/241 |
| 9,186,909 | B1 * | 11/2015 | Paliy | H04N 5/3572 |
| 9,270,872 | B2 * | 2/2016 | Donohoe | H04N 5/3572 |
| 9,300,888 | B2 * | 3/2016 | Yip | H04N 5/3572 |
| 9,361,537 | B2 * | 6/2016 | Paliy | G06K 9/40 |

* cited by examiner

*Primary Examiner* — Luong T Nguyen
(74) *Attorney, Agent, or Firm* — EIP US LLP

(57) ABSTRACT

The present disclosure provides an adaptive shading correction method for correcting an image for lens shading, including segmenting the image into a plurality of blocks of pixels and identifying hue-flat blocks with a relatively low hue variance, where the hue-flat blocks are clustered into at least one cluster based on a spatial distribution of the blocks. Selected modification parameters for modifying an average shading mesh are identified by modifying the average shading mesh along a plurality of dimensions using a plurality of modification parameters, and processing the at least one cluster with the average shading mesh as modified so as to identify the selected modification parameters. The average shading mesh is modified using the selected modification parameters to generate a shading correction mesh, which is used to correct the image for lens shading.

20 Claims, 7 Drawing Sheets

ADAPTIVE SHADING CORRECTION

CROSS-REFERENCE TO RELATED APPLICATIONS

This application claims priority to UK Application No. GB 1516173.0, filed Sep. 14, 2015. The entire contents of the above-referenced patent application are hereby incorporated by reference.

BACKGROUND OF THE INVENTION

Field of the Invention

The present invention relates to an adaptive shading correction method and an image signal processor for performing an adaptive shading correction method.

Description of the Related Technology

The physical phenomenon of lens shading, sometimes referred to as vignetting, is known. Lens shading is the phenomenon that the brightness or intensity of an image gradually decreases radially away from the center of an image. Lens shading may be caused, for example, by various features of a camera unit for capturing an image, which typically includes a lens and a sensor. For example, reasons for lens shading may include: variations at sensor level, for example in a color filter array (CFA) or micro-lens, or pixel crosstalk; variation of infrared (IR) cutoff filters and/or a change in a cutoff frequency over the angle of incident light even for the same IR cutoff filter (IRCF); a chief ray angle (CRA) mismatch between a sensor CRA and a lens CRA; or assembly issues such as misalignment, offset and/or tilt of the lens with respect to the sensor. For example, the lens assembly can hinder the amount of light falling towards border pixels of a sensor, such as a CMOS (complementary metal-oxide-semiconductor) sensor.

FIGS. 1a to 1f show examples of a flatfield image captured under three different light sources for two different sensors. These Figures show the brightness of the flatfield image decreasing radially away from the center of the image. FIGS. 1a, 1c and 1f are for a first sensor and FIGS. 1b, 1d and 1e are for a second, different, sensor. The light sources are the same for FIGS. 1a and 1b; for FIGS. 1c and 1d; and for FIGS. 1e and 1f. As can be seen in FIGS. 1a to 1f, the profile of the brightness gradient, sometimes referred to as the lens shading function or the flatfield, differs from one light source to another and from one sensor, e.g. one CMOS sensor, to another.

The profile of the brightness gradient away from the center, or the shape of the lens shading or vignetting function, is not always diagonally symmetric. Furthermore, in CMOS image sensors with a CFA, the profile of brightness gradient may be different from one color channel to another. This difference of profiles of brightness gradient from one color channel to another can give rise to an artifact known as color shading in image, in which the resulting image is left with shades of different colors. This may occur, for example, if luminance degradation in the image is incorrectly compensated for.

If, however, the radial intensity falloff due to lens shading can be accurately identified, the lens shading effect can be compensated for. If an image with color shading is compensated with an incorrect shading correction function, however, there will be tints of color left in the output image, which can make the image look unnatural, as described above.

Known methods of correcting for lens shading often focus on correcting for a single sensor. A shading correction function can be modelled as a surface with given parameters or estimated in laboratory conditions. The shading correction function (sometimes referred to as the vignetting function) can be approximated by a polynomial or estimated in the lab environment by capturing flatfield images under different light sources. The vignetting function can then be used to change the values of the pixels of the image. For example, to remove or reduce the effect of lens shading, the pixel values in the image can be multiplied by the inverse of the profile of brightness gradient, which in this example may be considered to correspond to the shading correction function. However, such methods mainly focus on correcting for luminance shading and often neglect per-unit variations in camera units, which can result in residual artifacts such as color shading, discussed above.

For example, each camera unit that is manufactured is generally a unique product due e.g. to manufacturing variations at sensor level in the CFA and in the micro-lens, variation of the IR cutoff filters and changes in the IR cutoff frequency over the angle of incident light. Furthermore, assembly issues such as misalignment between the lens and sensor, or tilting of the lens may also contribute to per-unit variations of different sensors, as noted above. Thus, due to such per-unit variations of camera units, the shading correction function must be tuned for each individual unit, for example as the shading correction function may be unique to each sensor. This is not feasible to do in laboratory conditions, especially for mass-produced camera units such as those of mobile phones. Furthermore, the shading correction function, sometimes referred to as the lens shading function, may also change depending on the light source used to illuminate the image.

While per-unit calibration can be an expensive process, other known shading correction techniques try to compensate for per-unit variations by adapting the vignetting function from one sensor to another. However, most of these methods rely on Auto White Balance (AWB) statistics to deduce the color temperate from the image and then appropriately modify the vignetting function.

Another known method of correcting for lens shading is sometimes referred to as "Mesh Shading Correction" (MSC). In this method, a flatfield (sometimes referred to as a mesh) is captured under three different lighting sources, for a given sensor, and stored in a memory. When a raw image is presented to the shading correction block, the Auto White Balance (AWB) statistics are first used to deduce the color temperature. Then based on the color temperature the flatfields (meshes) at different temperatures are blended appropriately to find a suitable mesh for the image. The inverse of the mesh is applied to the raw image to correct for shading.

These known approaches suffer from certain problems. For example, certain techniques are non-adaptive and thus lead to per-unit variations, which can cause color shading artifacts as explained above. Moreover, per-unit calibration tends to be quite an expensive process and per-unit calibration cannot cover all light sources due to cost. Some of the more advanced adaptive techniques, such as the MSC approach, rely on correct illuminant estimation, however, these techniques can be quite scene dependent and are liable to fail. In addition, the MSC approach does not account for per-unit variations for e.g. a different sensor of the same type as the flatfields are captured for a given sensor. Thus, if a single shading correction function is applied to all sensors, for example all camera units, of a given type, without accounting for per-unit variations, color shading may become visible in the resulting image. This can manifest as a color cast on the image, which is undesirable.

It is desirable to provide an adaptive shading correction method that does not suffer from or has a reduced susceptibility to the issues of known approaches. For example, it is desirable to provide a shading correction method that can account for per-unit variations and that is adaptive to different lighting conditions.

SUMMARY

According to a first aspect of the present invention, there is provided an adaptive shading correction method for correcting an image for lens shading, the adaptive shading correction method comprising: segmenting the image into a plurality of blocks of pixels; identifying hue-flat blocks of the plurality of blocks, the hue-flat blocks having a relatively low hue variance; clustering the hue-flat blocks into at least one cluster based on a spatial distribution of the hue-flat blocks; identifying selected modification parameters for modifying an average shading mesh by: modifying the average shading mesh along a plurality of dimensions using a plurality of modification parameters, different ones of the plurality of modification parameters corresponding to a respective different dimension of the plurality of dimensions, and processing the at least one cluster, so as to identify the selected modification parameters; modifying the average shading mesh using the selected modification parameters to generate a shading correction mesh; and correcting the image for lens shading using the shading correction mesh.

According to a second aspect of the present invention, there is provided an image signal processor configured to perform an adaptive shading correction method for correcting an image for lens shading, the adaptive shading correction method comprising: segmenting the image into a plurality of blocks of pixels; identifying hue-flat blocks of the plurality of blocks, the hue-flat blocks having a relatively low hue variance; clustering the hue-flat blocks into at least one cluster based on a spatial distribution of the hue-flat blocks; identifying selected modification parameters for modifying an average shading mesh by: modifying the average shading mesh along a plurality of dimensions using a plurality of modification parameters, different ones of the plurality of modification parameters corresponding to a respective different dimension of the plurality of dimensions, and processing the at least one cluster, so as to identify the selected modification parameters; modifying the average shading mesh using the selected modification parameters to generate a shading correction mesh; correcting the image for lens shading using the shading correction mesh.

BRIEF DESCRIPTION OF THE DRAWINGS

Various features of the present disclosure will be apparent from the detailed description taken in conjunction with the accompanying drawings, which together illustrate, by way of example only, features of the present disclosure, and wherein:

FIG. 5 is a schematic illustration of neighboring blocks for clustering purposes, according to examples;

FIG. 6 is a schematic illustration of candidate clusters for a block N, according to examples;

FIGS. 7a and 7b illustrate a schematic example of a clustering operation according to examples;

DETAILED DESCRIPTION OF CERTAIN INVENTIVE EMBODIMENTS

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1A:
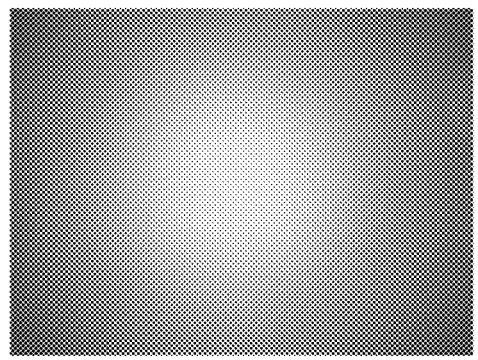
FIGS. 1a to 1f show example differences visible in a flatfield captured under different light sources.
Figure 1B:
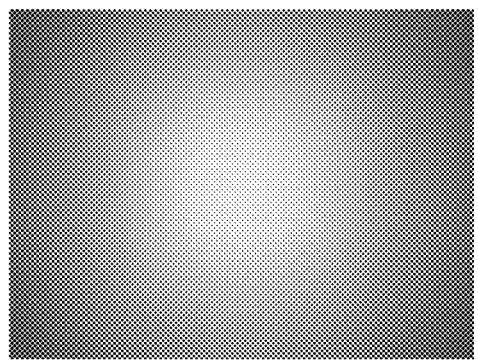
Figure 1C:
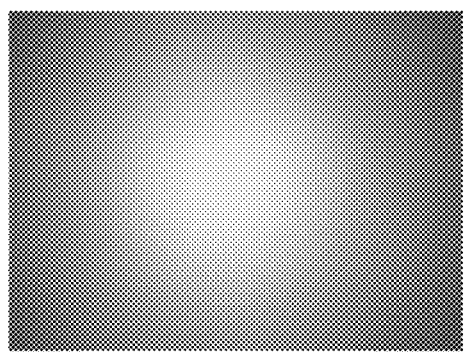
Figure 1D:
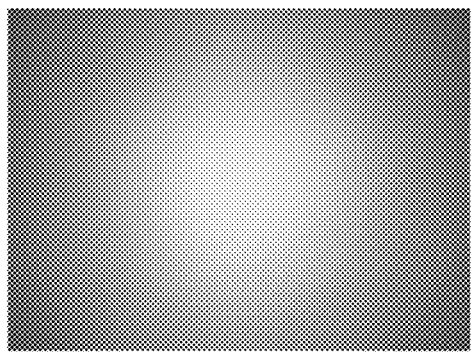
Figure 1E:
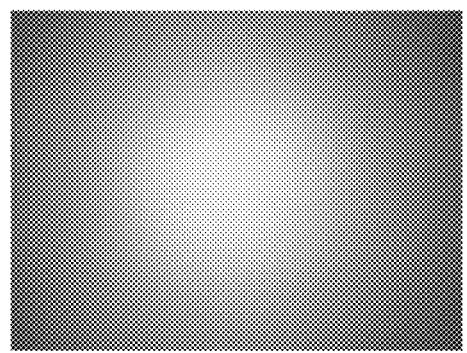
Figure 1F:
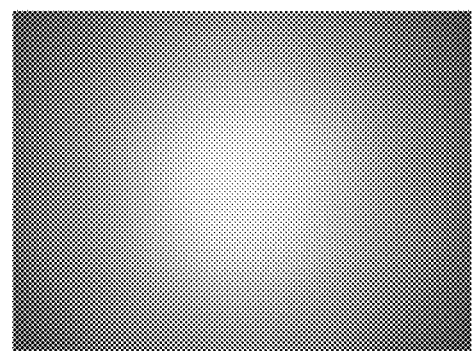
Figure 2:
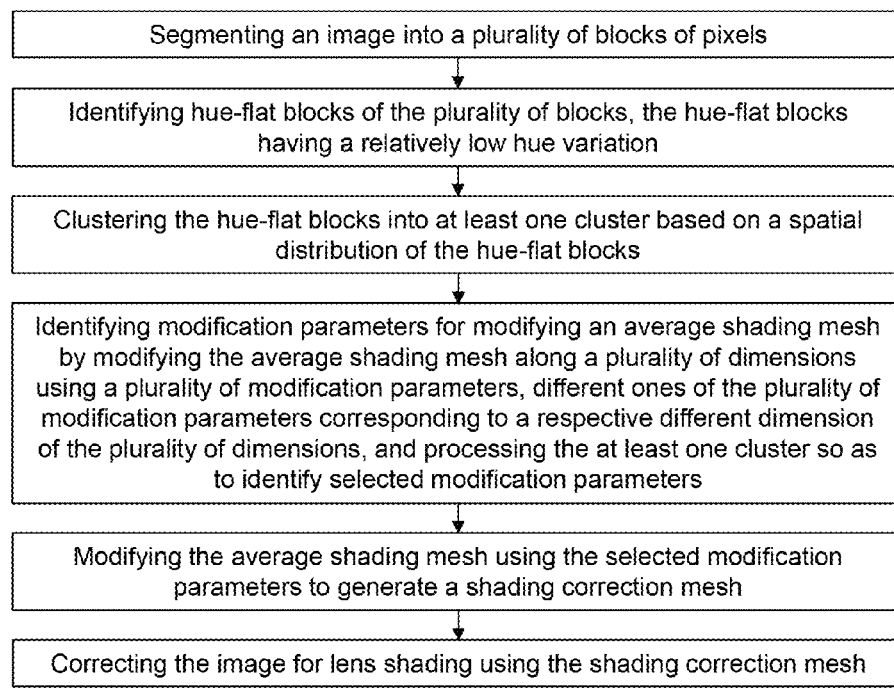
FIG. 2 is a flow diagram illustrating an adaptive shading correction method according to examples.

Examples described herein provide an adaptive shading correction method for correcting an image for lens shading. FIG. 2 is a flow diagram illustrating an adaptive shading correction method according to such examples. As shown in FIG. 2, the adaptive shading correction method in examples includes segmenting the image into a plurality of blocks of pixels and identifying hue-flat blocks of the plurality of blocks, the hue-flat blocks having a relatively low hue variance. The method of FIG. 2 further includes clustering the hue-flat blocks into at least one cluster based on a spatial distribution of the hue-flat blocks. Modification parameters for modifying an average shading mesh are identified by modifying the average shading mesh along a plurality of dimensions using a plurality of modification parameters, different ones of the plurality of modification parameters corresponding to a respective different dimension of the plurality of dimensions, and processing the at least one cluster so as to identify selected modification parameters. In examples in accordance with FIG. 2, the method further includes modifying the average shading mesh using the selected modification parameters to generate a shading correction mesh and correcting the image for lens shading using the shading correction mesh.

The adaptive shading correction method according to examples can be used to adaptively correct images for lens shading, eliminating the need for per-unit calibration and/or the need for light source or illuminant identification, unlike a current industry standard vignetting correction method. For example, the adaptive shading correction method in examples preserves color saturation, leading to an improved image quality compared with known methods. For example, the adaptive shading correction method can be used to correct images for lens shading without losing naturally occurring shadows in the image and without losing overall saturation. Moreover, the adaptive shading correction method in examples can be implemented in a lightweight manner, so that the method can be realizable for real-time vignetting correction, e.g. using a field programmable gate array (FPGA) architecture. For example, the adaptive shading correction method can be implemented on various image signal processors (ISPs), e.g. mobile image signal processors. Details of the adaptive shading correction method according to various examples are discussed in more detail below.

Figure 3:
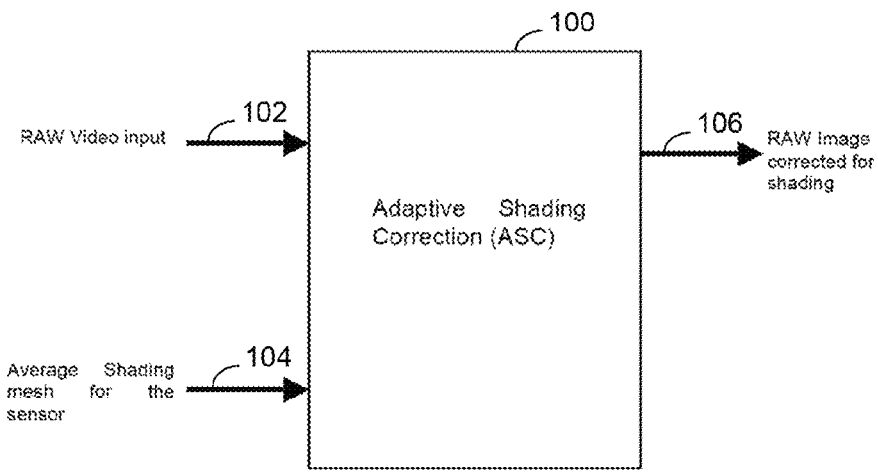
FIG. 3 shows schematically interfaces to an adaptive shading correction module according to examples.

FIG. 3 shows schematically interfaces to an adaptive shading correction module 100 according to examples. The adaptive shading correction module 100 receives as inputs a raw video input 102 and an average shading mesh 104 for a sensor used to capture the image, e.g. the sensor used to capture the raw video input 102. This Figure gives the example of receiving raw video input 102, however, in other examples the adaptive shading correction module 100 may instead receive image input, for example for a static image. The adaptive shading correction module 100 outputs a raw image 106 corrected for lens shading. As the skilled person will understand, reference to a raw image herein may for example refer to an image which has been minimally processed and which may require further processing before printing or editing with a bitmap graphics editor, e.g. to convert the raw image file to a different file format for storage, printing or further processing.

The adaptive shading correction module 100 in examples sits after black level correction and noise reduction blocks and, for example, may replace a status mesh shading correction block in an image signal processor.

Figure 4:
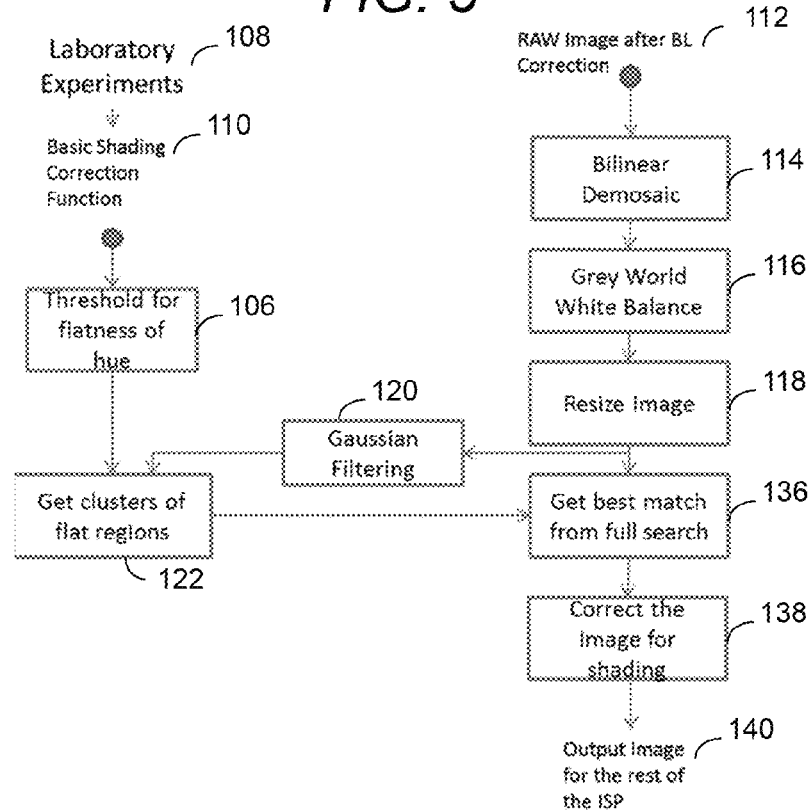
FIG. 4 shows an illustrative block diagram of an adaptive shading correction method according to examples.

FIG. 4 shows an illustrative block diagram of an adaptive shading correction method according to examples. In the example of FIG. 4, laboratory experiments 108 are used to obtain a basic shading correction function 110, which in examples is an average shading mesh. In this example, the adaptive shading correction method further includes capturing a respective flatfield image for each of a plurality of different light sensors of a plurality of sensors of the same type and averaging the flatfield images to generate the average shading mesh. For example, 8 different sensors of the same type may be illuminated with 7 different light sources. The resultant raw images may be processed and averaged to generate a representative shading mesh, which may be referred to as the average shading mesh, and which may also be considered to be a vignetting function. The average shading mesh may therefore be considered to be a representative profile of a brightness gradient for a predetermined sensor type, for example the sensor type the 8 different sensors belong to. In other examples, however, the average shading mesh may be obtained differently. The average shading mesh in examples is modified to generate the shading correction mesh, as will be described in more detail below.

In examples such as FIG. 4, the image is pre-processed before the adaptive shading correction. For example, the process of correcting the image may include three main stages: a pre-processing stage, analysis of the pre-processed image and finding of the shading correction mesh. In the example of FIG. 4, black level correction of the image and noise reduction of the image are first performed to generate a raw image after initial correction 112. The raw image after initial correction 112 is then pre-processed. The pre-processing in the example of FIG. 4 includes bilinear demosaicing 114, adjusting a grey world white balance 116, resizing the image 118 (sometimes referred to as downsampling) and Gaussian filtering 120 of the image. In other examples, the pre-processing may involve different processes or may be dispensed with.

Subsequently, the image is processed to identify regions of similar color, or hue, in the image. In examples such as that of FIG. 4, this involves segmenting the image into a plurality of blocks of pixels. For example, a suitable block size is 17 pixels by 17 pixels, although blocks in other examples may be non-square. Each of the blocks of pixels may be equal in size, or some blocks may be of a different size than other blocks. A block may be identified as hue-flat if that particular block has a relatively low hue variance. Variation of hue, or hue variance, in examples may be determined based on a color variance for the block. For example, hue-flat blocks may be identified by calculating, for blocks of the plurality of blocks, a respective hue variance for a first color with respect to a second color; calculating, for blocks of the plurality of blocks, a respective hue variance for a third color with respect to the second color; and identifying blocks of the plurality of blocks with the hue variance for the first color with respect to the second color less than a first threshold and with the hue variance for the third color with respect to the second color less than a second threshold.

In examples, the first color is red, the second color is green and the third color is blue. In such examples, the hue variance for red with respect to green, $H_{r/g}$, for a block of the plurality of blocks may be calculated as:

$$H_{r/g} = \frac{\sum_N (r/g - \overline{r/g})^2}{N}$$

where r is the proportion of red in a pixel of the block, g is the proportion of green in the pixel of the block, N is the number of pixels in the block, and $\overline{r/g}$ is a ratio of the proportion of red to the proportion of green averaged over the pixels in the block, and the hue variance for blue with respect to green, $H_{b/g}$, for the block of the plurality of blocks may be calculated as:

$$H_{b/g} = \frac{\sum (b/g - \overline{b/g})^2}{N}$$

where b is the proportion of blue in a pixel of the block, g is the proportion of green in the pixel of the block, N is the number of pixels in the block, and $\overline{b/g}$ is a ratio of the proportion of blue to the proportion of green averaged over the pixels in the block.

In such cases, a particular block may be considered hue-flat if the hue variance for both red with respect to green (sometimes denoted as r/g) and blue with respect to green (sometimes denoted as b/g) are both less than respective thresholds, $Th_r$ and $Th_b$ respectively:

$$F = \begin{cases} 1 & \text{if } H_{r/g} \leq Th_r \cap H_{b/g} \leq Th_b \\ 0 & \text{else} \end{cases}$$

In an example, the thresholds $Th_r$ and $Th_b$ are calculated as 3 times the maximum hue variance in the average shading mesh, although other thresholds are possible in other examples. The thresholds are typically selected so as to isolate natural variations of hue from hue variations caused by lens shading.

In examples, such as that of FIG. 4, the hue-flat blocks are clustered together into at least one cluster 122 based on their spatial distribution. In some cases, an average hue variance may also be used to cluster the hue-flat blocks. An illustrative example of a clustering method will now be described with reference to FIGS. 5 to 7, although it is to be appreciated that in other examples different clustering methods may be used to group the hue-flat blocks together into the at least one cluster 122.

Figures 5, 6, 7A, 7B:
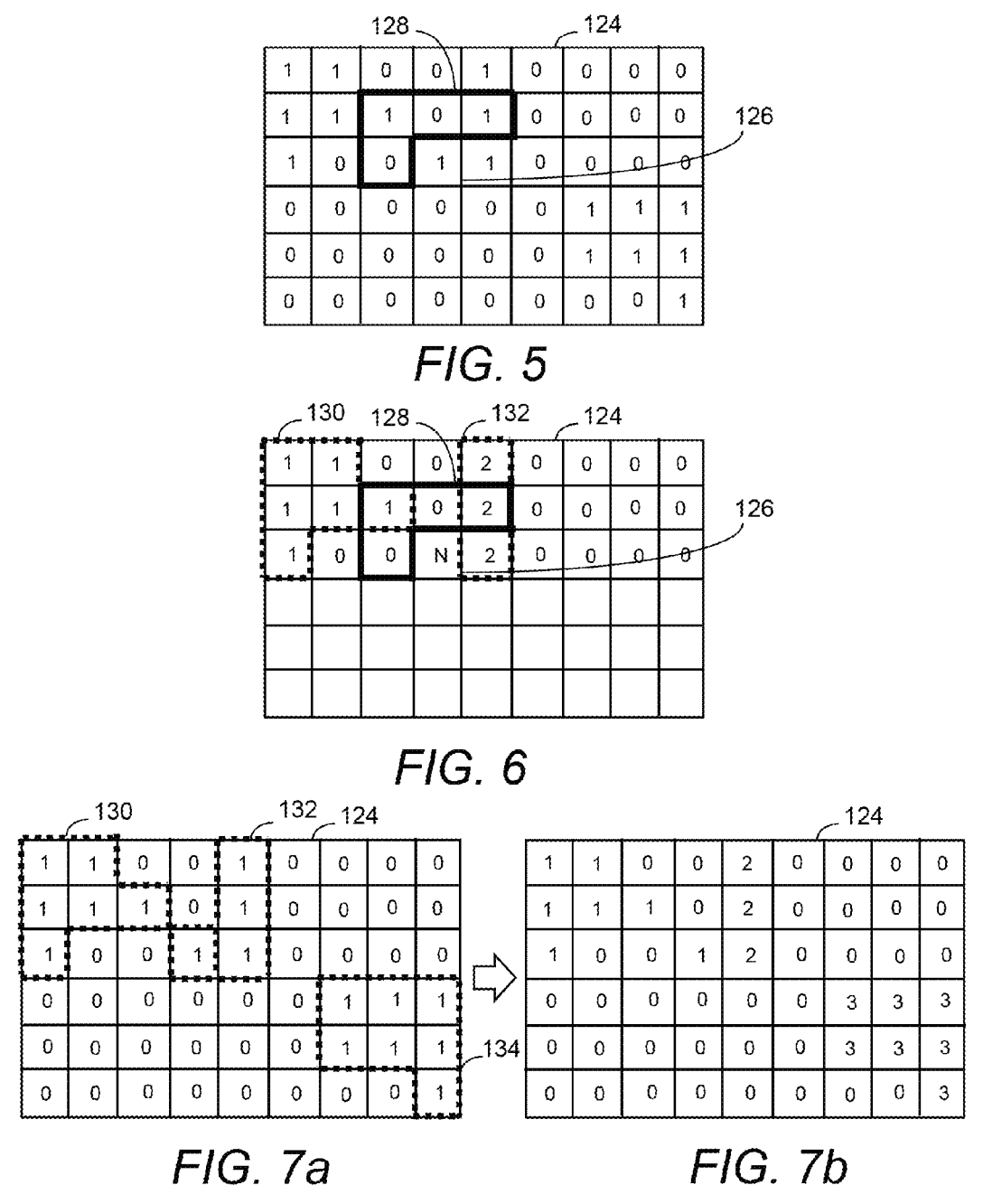

In FIGS. 5 to 7, for each block that is hue-flat, there is an attempt to assign a cluster number. To assign a cluster number, four spatial neighbors and their corresponding cluster number are considered, although in other examples a different number of neighboring blocks may be considered. This is illustrated schematically in FIG. 5, which shows a grid of blocks 124. Each block of the grid of blocks is classified as hue-flat (denoted by a 1 in the block) or non-hue-flat (denoted by a 0 in the block). The grid of blocks 124 includes a hue-flat block 126 and four neighboring blocks 128. The neighboring blocks 128 are surrounded by a thick black line in the Figure. In this case, the neighboring blocks considered are the left block, the top block, the top left block and the top right block, with respect to the hue-flat block 126, although in other cases, different blocks may be considered as the neighboring blocks.

Next, a set of candidates for the cluster number for the hue-flat block 126 is derived from the cluster numbers of the neighboring blocks 128. All non-zero cluster numbers of the neighboring blocks 128 will become candidates. If there are no non-zero clusters in the neighborhood, a new cluster number is assigned to the hue-flat block 126. An illustrated example of assigning a cluster number to the hue-flat block 126 is provided in FIG. 6. In FIG. 6, the blocks are labelled by cluster number, rather than by whether they are hue-flat or not. Thus, FIG. 6 illustrates a first cluster 130, with cluster number 1, and a second cluster 132, with cluster number 2. The block to be assigned to a cluster is denoted as block N. The first and second clusters 130, 132 are each respectively surrounded by a thick dashed line and the neighboring blocks 128 are surrounded by a thick black line, as in FIG. 5.

As shown in the example of FIG. 6, when assigning a cluster number to the block N, there are two candidates: the first cluster 130 (cluster number 1) or the second cluster 132 (cluster number 2). To further filter down the number of candidate clusters, the average hue variance of the block N is compared against the average hue variance of the candidate clusters 130, 132. In this example, the comparison involves comparing an average, for example a mean, r/g of the hue-flat block 126 with a mean r/g of each respective cluster and comparing an average, for example a mean, b/g of the hue-flat block with a mean b/g of each respective cluster, where r is the proportion of red, g is the proportion of green, and b is the proportion of blue, although other comparisons are possible.

At this stage, if there is just one candidate cluster, the block N will be assigned to the candidate cluster and the mean or average hue variance of the candidate cluster will be adjusted accordingly. If there is more than one candidate cluster with the same cluster number, all the candidate clusters will become one cluster with that cluster number, and the block N will also be assigned to the consolidated cluster. All the blocks that belonged to the candidate clusters will be reassigned to the consolidated cluster number. In this scenario, the block N will act as a bridge to connect two or more disconnected clusters of hue-flat blocks.

FIGS. 7a and 7b illustrates schematically an outcome of a clustering operation according to an example. FIG. 7a illustrates a first, second and third cluster of blocks 130, 132, 134, which each include hue-flat blocks (hue-flat blocks are labelled in FIG. 7a with a 1 and non-hue-flat blocks are labelled in FIG. 7a with a 0). After clustering, the hue-flat blocks are arranged in the first, second and third clusters 130, 132 and 134 illustrated in FIG. 7b, which shows the cluster numbers associated respectively with these clusters (i.e. the numbers in each block represent cluster number in FIG. 7b, rather than hue-flatness).

The clustering shown in FIGS. 5 to 7 may therefore be summarized as involving, for each hue-flat block, determining a hue-flatness of other blocks in a spatial neighborhood of the hue-flat block; in response to determining that none of the other blocks are hue-flat, assigning the hue-flat block to a new cluster; in response to determining that solely one of the other blocks is hue-flat, assigning the hue-flat block to the same cluster as the one of the other blocks; and in response to determining that more than one of the other blocks is hue-flat, assigning the hue-flat block to a cluster comprising one of the more than one of the other blocks in dependence on a comparison between an average hue variance of the hue-flat block and an average hue variance of each cluster comprising one of the more than one of the other blocks.

Referring back to FIG. 4, in this example, after the at least one cluster 122 is identified, the shading correction mesh, sometimes referred to as the "best" shading correction mesh (although it is to be appreciated that, in some cases, the shading correction mesh may not be the optimal or best mesh), is identified 136. The shading correction mesh is used to correct the image for shading 138 and the image is output 140, for example for use by the rest of the image signal processor (ISP). For example, the correcting the image for lens shading using the shading correction mesh may include, for each of a plurality of pixels of the image, multiplying a pixel value of a pixel of the plurality of pixels with a respective value of an inverse of the shading correction mesh.

Figure 8A:
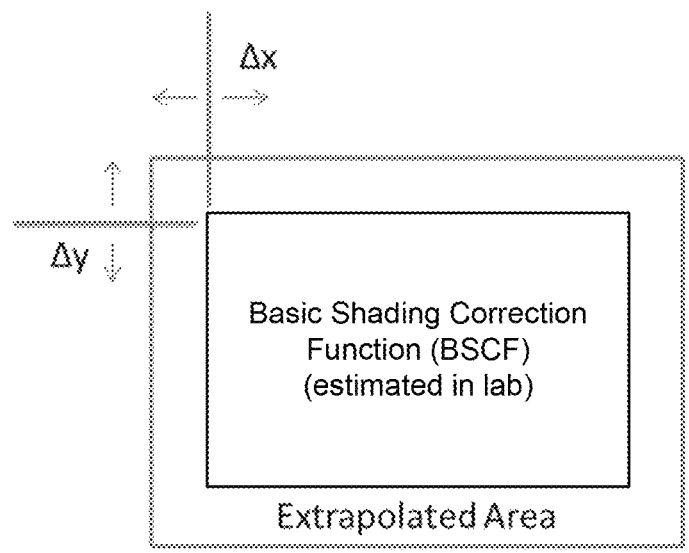
FIGS. 8a and 8b are schematic illustrations of adaptation dimensions according to examples.
Figure 8B:
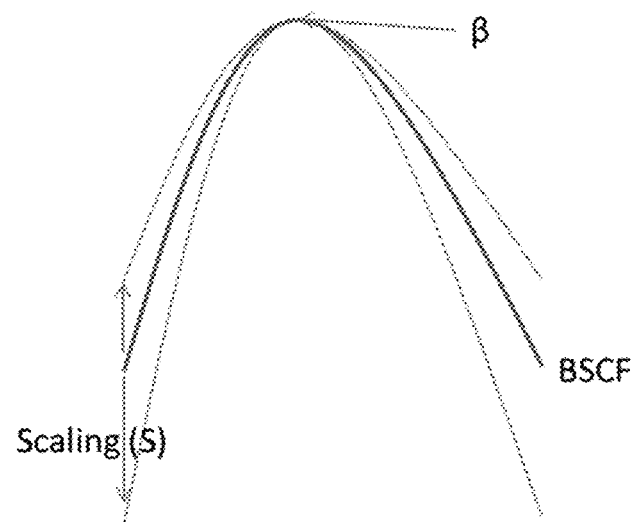

An example of identifying the shading correction mesh is illustrated schematically in FIGS. 8a and 8b. In this example, to find the shading correction mesh, the average shading correction mesh (referred to in FIG. 8a as the basic shading correction function, BSCF) is gradually modified along three dimensions. For example, the average shading mesh may be modified in steps along each of the dimensions. FIG. 8a shows a shifting of the average shading mesh in x and y directions (denoted by $\Delta x$ and $\Delta y$ respectively in the Figure) and FIG. 8b shows a scaling of the cross section of the average shading mesh (denoted by S in the Figure). The plurality of modification parameters referred to with reference to FIG. 2 may therefore be considered to include a vertical shift of the average shading mesh, a horizontal shift of the average shading mesh and a scaling of the average shading mesh in this example.

In examples, the scaling of the average shading mesh may be performed as follows:

$$f_{scaled} = \beta - S(\beta - f)$$

where $\beta$ is the maximum of the average shading mesh, S is the scaling factor, f is the average shading mesh and $f_{scaled}$ is the scaled average shading mesh.

At least one of the vertical shift is within a predetermined vertical search range, the horizontal shift is within a predetermined horizontal search range or the scaling is within a predetermined scaling range in examples. For example, the horizontal and vertical search range may be limited to 7×7 pixels, i.e. so that a maximum Δx is ±3. The scaling range may be for example between 0.9 and 1.1, in steps of 0.2.

The selected modification parameters, such as the shifting or scaling of the average shading mesh, may be selected. The selection of the modification parameters typically involves processing of the at least one cluster. For example, the average shading mesh as modified may be applied to the at least one cluster and the modification parameters may be chosen based on the hue variance of the at least one cluster of the image as corrected using the average shading mesh. The selected modification parameters in examples are selected to minimize a total hue variance of the at least one cluster, for example upon correction of a first color channel of the image using the average shading mesh modified using the selected modification parameters. In such examples, the total hue variance of the at least one cluster, $E_{x/y}$, for correcting the first color channel of the image may be calculated using:

$$E_{x/y} = \sum_{c}^{C} \sum_{i}^{N} (x/y - \overline{x/y})^2$$

where c is a cluster of the at least one cluster, C is the total number of clusters in the at least one cluster, N is the number of pixels in blocks of the cluster c, i is a pixel of the blocks of the cluster c, x is the proportion of a first color in the pixel i, y is the proportion of a second color in the pixel i, and $\overline{x/y}$ is a ratio of the proportion of the first color to the proportion of the second color averaged over the pixels in the blocks of the cluster c.

In such cases, the selected modification parameters may be determined by calculating the total hue variance of all the clusters for each modification of the average shading mesh and then identifying the selected modification parameters (which may be denoted as, for example, $\Delta x_{best}$, $\Delta y_{best}$ and $S_{best}$) by the modification that yields the lowest $E_{x/y}$:

$$(\Delta x_{best}, \Delta y_{best}, S_{best}) = \arg\min_{\Delta x, \Delta y, S} (E_{x/y})$$

In examples, the first color is red or blue and the second color is green. In these examples, the total hue variance may be calculated as $E_{r/g}$ or $E_{b/g}$ respectively.

The modifying the average shading mesh in examples, such as the example of FIG. 4, includes modifying the average shading mesh separately for each of a plurality of color channels, for example red, green and blue color channels. For example, the average shading mesh may be modified along the plurality of dimensions for individual color channels to identify the selected modification parameters.

In such cases, the method according to examples may include correcting a first color channel of the image using the average shading mesh to generate a first partly corrected image; and applying the adaptive shading correction method to the first partly corrected image. In these examples, the identifying the modification parameters may include identifying modification parameters for a second color channel of the first partly corrected image, the modifying the average shading mesh may include modifying the average shading mesh using the modification parameters for the second color channel of the first partly corrected image to generate the shading correction mesh, and the correcting the image for lens shading may include correcting the first color channel of the first partly corrected image for lens shading using the shading correction mesh to generate a second partly corrected image. In such examples, the first color channel of the second partly corrected image may be corrected using a further best shading correction mesh generated for a third color channel to generate a third partly corrected image. The first color channel may be green, the second color channel may be red and the third color channel may be blue, although other color channels are possible, as the skilled person will appreciate.

In these cases, the process may for example be considered to be exhaustive across all three color channels. In a particular example, the process involves correcting the green channel of the image with the unmodified green channel of the average shading mesh, finding adaptation or modification parameters, for example best adaptation parameters, for the red channel with use of the partly corrected image, correcting the green channel of the image with the modified red channel of the average scaling mesh and repeating the finding of the modification parameters for the blue channel with use of the partly corrected image after correction with the modified red channel of the average scaling mesh and correction of the blue channel using the selected modification parameters.

Figure 9:
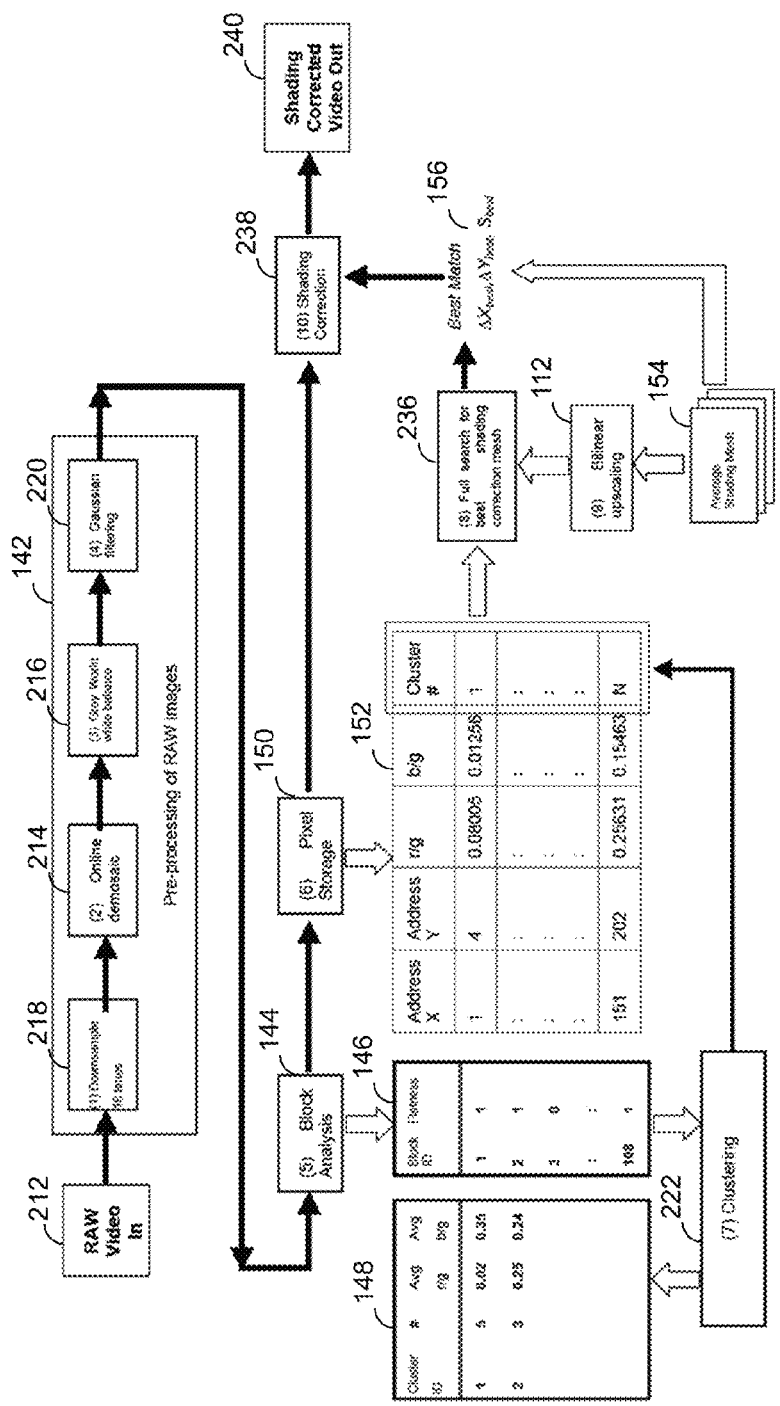
FIG. 9 is a block diagram of an example software implementation of an adaptive shading correction method according to examples.

The adaptive shading correction method according to examples may be implemented in software, for example using Matlab. FIG. 9 shows a block diagram of a software implementation of an adaptive shading correction method according to examples. The implementation can be viewed as including three main stages, as noted above: a pre-processing stage, analysis of the pre-processed image and finding of the shading correction mesh. Each of these stages can be broken down into sub-blocks as shown in FIG. 9. Functions (1)-(6) of FIG. 9 are typically performed as the image is scanned and functions (7)-(8) may be performed during a vertical blanking period and during a second frame. The implementation of the example of FIG. 9 may, for example have a memory requirement of 53×70×3 pixels for storage of the average shading mesh, 108 locations with 1/0 for storage of a flatness table and 51×68×(2 pixel size+ cluster number) for pixel storage.

The example implementation of FIG. 9 is similar to the adaptive shading correction method of FIG. 4. Features of FIG. 9 similar to those of FIG. 4 are labelled with the same reference number but incremented by 100; corresponding descriptions should be taken to apply.

In FIG. 9, raw video is received as an input 212. The raw video images are pre-processed 142. The pre-processing 142 includes downsampling 218 the image, demosaicing 214 the image, for example using nearest neighbor or bilinear demosaicing, applying a grey world white balance 216 process to the image and Gaussian filtering 218 of the image. In this example, the image is downsampled 218 sixteen times, although in other examples the image may be downsampled by a different factor. For example, sixteen may be a default downsampling factor or ratio and the pre-processing may involve reading in a desired downsampling factor or ratio based on a user input. As a further input to the pre-processing 142 of FIG. 9, the pre-processing 142 may receive the number of rows in the downsampled image, the number of columns in the downsampled image and the number of planes in the downsampled image (which is e.g. 3 for an RGB image, i.e. an image with a red, green and blue color channel). The pre-processing 142 of FIG. 9 involves the same processes as the pre-processing of the example of FIG. 4 but in a different order.

In examples, the method of FIG. 9 may also include reading appropriate average scaling mesh parameters (not shown in FIG. 9). This may include reading the average scaling mesh to memory and setting parameters such as the blocksize to segment the raw image, e.g. the downsampled by factor. The parameters may also include the asymmetry level in terms of the pixels for rectangle blocks. If the asymmetry level is set to 0, for example, the block of pixels may be of blocksize×blocksize in dimensions. The parameters may include the resolution at which the search for the selected modification parameters is performed in the scale dimension, a minimum scale value, a maximum scale value and/or other limits of search dimensions, such as the limit on $\Delta x$ or $\Delta y$ in one direction. For example, if the extent is 3, a total area of 7×7 pixels may be searched during the identifying the selected modification parameters. The average scaling mesh parameters may also include the thresholds to determine if a block of pixels is to be considered hue-flat or not. For example, the threshold variable may include two elements: a threshold for a first color channel (e.g. red) and a threshold for a second color channel (e.g. blue). The average shading mesh may for example be derived from laboratory experiments, as described above. Typically, the average shading mesh has gone through downsampling and bilinear upsampling. The reading of the average scaling mesh parameters may, for example, occur before the pre-processing 142 of the image. As a further input to the adaptive shading correction there may be a variable to indicate whether adaptive shading correction is to be applied or not. For example, if the value of the variable is set to 0, traditional mesh shading may be applied, for example an average mesh shading correction without any adaptation.

After the pre-processing 142, the image undergoes block analysis 144 in the example of FIG. 9. A list of blocks 146 is provided, with each block associated with a flatness value indicating whether the block is considered a hue-flat block or not. In this example, hue-flat blocks are associated with a flatness of 1 and non-hue-flat blocks are associated with a flatness of 0. The blocks undergo clustering 222, which may for example be similar to the clustering described with reference to FIGS. 5 to 7. The output of the clustering is a list of clusters 148, including a cluster identification number, a number of blocks in the respective cluster, an average r/g of the respective cluster and an average b/g of the respective cluster.

Subsequently, the output of the clustering is used for pixel storage 150, in which a table of pixels 152 is stored with a pixel address in row and column space, an r/g value of the respective pixels, a b/g value of the respective pixel and the cluster the respective pixel is associated with. In an example, this table will contain 51×68 entries, although other numbers of entries are possible in other examples. The output of the clustering may also be or include a value to indicate if there are any clusters of hue-flat regions. For example, if this value is 0 (indicating no hue-flat regions), a traditional mesh shading may be applied instead of the adaptive shading correction method according to examples.

In FIG. 9, the table of pixels 152 is used in a full search 236 for the shading correction mesh, which may be as described above with reference to FIGS. 8*a* and 8*b*. In this example, the search 236 for the shading correction mesh includes as an input the average shading mesh 154, which may be similar to the average shading mesh 104 described with reference to FIG. 3. The average shading mesh 154 in the example of FIG. 9 undergoes bilinear upscaling 156 before being input to the search 236 for the shading correction mesh.

The output of the search 236 for the shading correction mesh in the example of FIG. 9 are the selected modification parameters 156, which in this example are $\Delta x_{best}$, $\Delta y_{best}$ and $S_{best}$ as described above, and which may also include the size of the shading correction mesh in the x direction (e.g. the number of columns) and the size of the shading correction mesh in the y direction (e.g. the number of rows).

The selected modification parameters 156 are used to generate the shading correction mesh, which is used to apply the shading correction 238 to the image. In the example of FIG. 9, the shading correction is applied to the image of the original resolution, after bilinear demosaicing and grey world white balancing. The original downsampling factor may also be provided as an input to the shading correction 238, for bilinear upsampling to produce the shading correction mesh. The output of the shading correction 238 is the shading corrected image 240, which in this example is part of a video. The shading correction mesh obtained using the adaptive shading correction method may also be stored in examples.

Comparative Example

The performance of the adaptive shading correction method according to examples is compared against a known dynamic mesh shading correction algorithm (DMSC). The shading correction experiments were carried out on 160 raw images captured with several camera units manufactured by OmniVision, 4275 Burton Drive, Santa Clara, Calif. 95054, United States of America (Part No: OV8835).

While traditional image quality metrics (such as the structural similarity index, SSIM, or the video quality metric, VQM) cannot be used for this comparison, as they do not take color shading artifacts into consideration, the variance of hue in hue-flat regions may be taken as the color shading metric and the average pixel saturation may be taken as the saturation measure.

The results in Table 1 (below) indicate that the adaptive shading correction method according to examples outperforms the DMSC algorithm in terms of color shading measured using the hue-variance metric, without compromising the overall saturation:

TABLE 1

Comparison of performance of the adaptive shading correction method according to examples and the DMSC algorithm in terms of color shading and saturation.

| | Hue-variance in hue-flat blocks | Average pixel saturation |
|---|---|---|
| DMSC algorithm | 0.072 | 0.2165 |
| Adaptive shading correction method | 0.064 | 0.2115 |

APPENDICES

Appendix 1 illustrates an example Matlab function flow and Appendix 2 illustrates example Matlab function interfaces. Both of these examples may be used with the Matlab implementation described with reference to FIG. 9. These Appendices are to be considered part of the application as filed and Applicant reserves the right to include material from the Appendices in the main description.

The above examples are to be understood as illustrative examples. Further examples are envisaged. For example, although FIG. 9 illustrates a software implementation of the adaptive shading correction method according to examples, in other examples, the adaptive shading correction method may be implemented using hardware, for example an image signal processor. Such an image signal processor may, for example, include a field programmable gate array.

Figure 10:
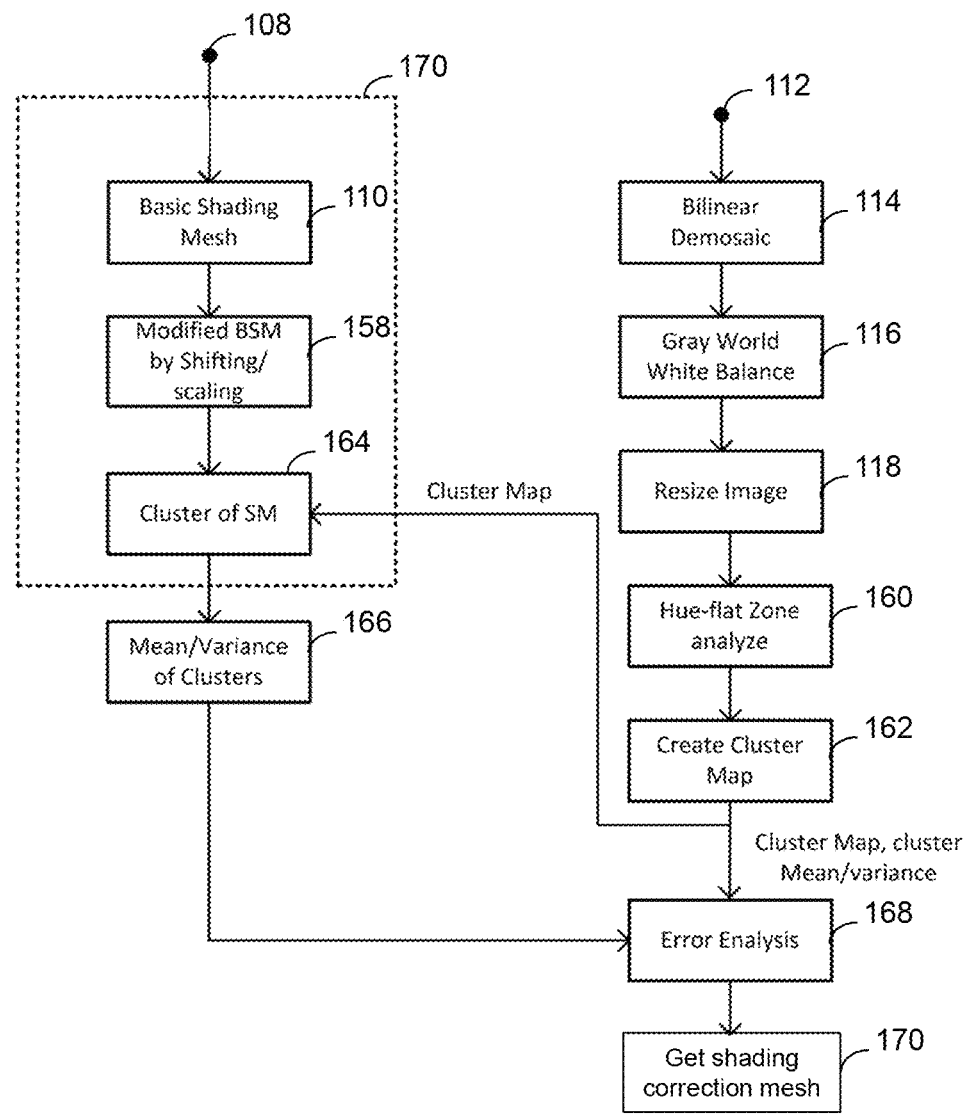
FIG. 10 shows an illustrative block diagram of an adaptive shading correction method according to further examples.

FIG. 10 illustrates a block diagram of an adaptive shading correction method according to further examples. Features of FIG. 10 that are the same as the adaptive shading correction method shown in FIG. 4 are labelled with the same reference numerals; corresponding descriptions are to be taken to apply.

As in the example of FIG. 4, the image of FIG. 10 is initially corrected to generate a raw image after initial correction 112. The raw image after initial correction 112 undergoes pre-processing, including bilinear demosaicing 114, adjusting a grey world white balance 116, resizing 118 and Gaussian filtering 120. After pre-processing, the image is analysed to identify hue-flat blocks, regions or zones 160 and to create a cluster map 162 of at least one cluster, for example so that each cluster has a relatively low hue variance. The identification of the hue-hue-flat zones 160 and the creation of the cluster map 162 may be performed for example as described with reference to FIGS. 5 to 7, although other methods are possible.

The method of the example of FIG. 10 further includes calculating the mean and the variance of clusters of the at least one cluster of hue-flat blocks of the image. The mean and the variance of a cluster of the image can, for example, be calculated using the mean and the variance of the hue-flat blocks of the cluster. The mean and variance may for example be a mean and variance of a hue of the blocks or the cluster of the image, which may be calculated for each color channel separately. For example, as described above, the total hue variance of the at least one cluster, $E_{x/y}$, for correcting a first color channel of the image may be calculated using:

$$E_{x/y} = \sum_c^C \sum_i^N (x/y - \overline{x/y})^2$$

where c is a cluster of the at least one cluster, C is the total number of clusters in the at least one cluster, N is the number of pixels in blocks of the cluster c, i is a pixel of the blocks of the cluster c, x is the proportion of a first color in the pixel i, y is the proportion of a second color in the pixel i, and $\overline{x/y}$ is a ratio of the proportion of the first color to the proportion of the second color averaged over the pixels in the blocks of the cluster c.

Referring now to the generation of the shading correction mesh, in the example of FIG. 10, laboratory experiments 108 are used to obtain a basic shading mesh 110, which in this example corresponds with an average shading mesh as described above. The average shading mesh 110 in FIG. 10 is modified 158, for example as described with reference to FIGS. 8a and 8b, although other methods are possible.

After creation of the cluster map 162 as described above, the average shading mesh after modification 158 in the example of FIG. 10 is itself partitioned or segmented into the same number of blocks as the image, which may be considered to be zones or regions of "nodes" or elements of the average shading mesh. For example, the average shading mesh may include a correction value per "node", for example within a certain range, which can be applied to or multiplied with the pixel or intensity value of a corresponding pixel of the image to correct the image for shading. The cluster map previously obtained from the at least one cluster of the hue-flat blocks of the image is overlaid over the blocks of the average shading mesh after modification 158 to obtain a cluster map 164 of the average shading mesh after modification 158.

In other examples, the cluster map 164 of the average shading mesh is obtained by overlaying the cluster map from the at least one cluster of the image over the blocks of the average shading mesh before the average shading mesh is modified. In such cases, the average shading mesh may subsequently be modified, for example by shifting in an x and/or y direction and/or by scaling to generate the modified average shading mesh.

Subsequently, in examples such as that of FIG. 10, the mean and variance of blocks within a cluster of the image as corrected using the average shading mesh as modified may be calculated, which may be considered to correspond with respective shading corrected resultant zones. These values can be obtained based on the calculation of the mean and variance of blocks within a cluster of the average shading mesh as modified and the mean and variance of blocks within a corresponding cluster of the image.

Various methods may be used to calculate the mean and variance of blocks of a cluster of the image as corrected using the average shading mesh as modified. For example, if the variance of a block of the image as corrected using the average shading mesh as modified is symbolized as σ, then σ may be calculated as:

$$\sigma = \sigma_{image} * \sigma_{mesh} + (\sigma_{image})^2 * \sigma_{mesh} (\sigma_{mesh})^2 * \sigma_{image}$$

where $\sigma_{image}$ is the variance of the corresponding block of the image and $\sigma_{mesh}$ is the variance of the corresponding block of the average shading mesh as modified.

Similarly, the mean of the block as corrected using the average shading mesh as modified, symbolized as μ, may be calculated as:

$$\mu = \mu_{image} * \mu_{mesh}$$

where $\mu_{image}$ is the mean of the corresponding block of the image and $\mu_{mesh}$ is the mean of the corresponding block of the average shading mesh as modified.

The calculation of the variance and the mean of blocks of the image and of the average shading mesh as modified is illustrated schematically in step 166 of the example of FIG. 10. The variance and the mean of blocks of the image and of the average shading mesh as modified, for example obtained as set out above, may then be used in an error analysis 168.

The error analysis 168 in examples such as that of FIG. 10 involves calculating the mean and variance of the cluster of the corresponding image as corrected using the average shading mesh as modified, which may be referred to as the corresponding shading corrected resultant image. The mean of each cluster $\mu_{cluster}$ of the shading corrected resultant image may for example be calculated using:

$$\mu_{cluster} = \sum_{i=1}^{N} \mu_i$$

where i is a block of the blocks in the cluster and N is the total number of blocks in the cluster.

The variance of the cluster $\sigma_{cluster}$ of the shading corrected resultant image may be calculated for example using:

$$\sigma_{cluster} = \sum_{i=1}^{N}(\sigma_i + (\mu_{cluster} - \mu_i)^2)$$

where the sum is over the blocks of the cluster, N.

The standard deviation, SD, of a cluster may be calculated, for example, as:

$$SD = \frac{N_B * \sqrt{\sigma_{cluster}}}{N_B^{Tot}}$$

where $N_B$ is the number of blocks in the cluster and $N_B^{Tot}$ is the total number of blocks in all the clusters.

An error function, EF, may then be calculated based on the standard deviation as:

$$EF = \sum_{i=1}^{C} SD_i$$

where C is the total number of clusters.

This process may be repeated for the average shading mesh as modified using a variety of different modification parameters, for example to identify the selected modification parameters. In examples, the selected modification parameters may be chosen to minimize the error function or such that the error function satisfies a predetermined criterion, such as being below a given threshold error value. Identification of the selected modification parameters allows the shading correction mesh to be obtained 170 by modifying the average shading mesh using the selected modification parameters to generate the shading correction mesh. The image may then be corrected using the shading correction mesh.

This process in examples may therefore be summarized as selecting the selected modification parameters to minimize an error function based on a variance and a mean of the at least one cluster and a variance and a mean of regions of the average shading mesh as modified, each region of the regions corresponding with a cluster of the at least one cluster. Thus, in examples in accordance with FIG. 10, the selected modification parameters are chosen without applying the average shading mesh as corrected to the at least one cluster. In such examples, the variance and the mean of the at least one cluster of the uncorrected image and of the average shading mesh itself (as modified) are calculated and used to select the selected modification parameters. This process may be implemented using software or hardware, as the skilled person will appreciate.

In further examples, rather than modifying the average shading mesh using the modification parameters and then calculating the mean and the variance of blocks and subsequently clusters of the average shading mesh as modified, the average shading mesh may instead be modified by interpolating a variance and a mean of zones or blocks of the average shading mesh, each zone of the zones corresponding with a block of the plurality of blocks. For example, the mean and variance of the average shading mesh may be calculated for each of the zones for various different modification parameters as applied to the average shading mesh by appropriately interpolating the mean and variance of the average shading mesh with given modification parameters (or prior to modification). The calculated mean and variance of the average shading mesh as modified may then be combined with the calculated mean and variance of the hue-flat blocks of the image to calculate the error function, for example as described above with reference to FIG. 10. The interpolation may be a linear or non-linear interpolation for example.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An adaptive shading correction method for correcting an image for lens shading, the adaptive shading correction method comprising:
   segmenting the image into a plurality of blocks of pixels;
   identifying hue-flat blocks of the plurality of blocks, the hue-flat blocks having a relatively low hue variance;
   clustering the hue-flat blocks into at least one cluster based on a spatial distribution of the hue-flat blocks;
   identifying selected modification parameters for modifying an average shading mesh by:
      modifying the average shading mesh along a plurality of dimensions using a plurality of modification parameters, different ones of the plurality of modification parameters corresponding to a respective different dimension of the plurality of dimensions, and
      processing the at least one cluster,
   so as to identify the selected modification parameters;
   modifying the average shading mesh using the selected modification parameters to generate a shading correction mesh; and
   correcting the image for the lens shading using the shading correction mesh.

2. The adaptive shading correction method of claim 1, comprising:
   capturing a respective flatfield image for each of a plurality of different light sensors for each of a plurality of sensors of a same sensor type; and
   averaging the flatfield images to generate the average shading mesh.

3. The adaptive shading correction method of claim 1, wherein the average shading mesh is a representative profile of a brightness gradient for a predetermined sensor type.

4. The adaptive shading correction method of claim 1, wherein the identifying the hue-flat blocks comprises:
   calculating, for blocks of the plurality of blocks, a respective hue variance for a first color with respect to a second color;
   calculating, for blocks of the plurality of blocks, a respective hue variance for a third color with respect to the second color; and
   identifying blocks of the plurality of blocks with the hue variance for the first color with respect to the second color less than a first threshold and with the hue variance for the third color with respect to the second color less than a second threshold.

5. The adaptive shading correction method of claim 4, wherein:

the first color is red, the second color is green and the third color is blue;

the hue variance for red with respect to green, $H_{r/g}$, for a block of the plurality of blocks is:

$$H_{r/g} = \frac{\sum_N (r/g - \overline{r/g})^2}{N}$$

where r is the proportion of red in a pixel of the block, g is the proportion of green in the pixel of the block, N is the number of pixels in the block, and $\overline{r/g}$ is a ratio of the proportion of red to the proportion of green averaged over the pixels in the block, and the hue variance for blue with respect to green, $H_{b/g}$, for the block of the plurality of blocks is:

$$H_{b/g} = \frac{\sum (b/g - \overline{b/g})^2}{N}$$

where b is the proportion of blue in a pixel of the block, g is the proportion of green in the pixel of the block, N is the number of pixels in the block, and $\overline{b/g}$ is a ratio of the proportion of blue to the proportion of green averaged over the pixels in the block.

6. The adaptive shading correction method of claim 1, wherein:

the selected modification parameters are selected to minimize a total hue variance of the at least one cluster upon correction of a first color channel of the image using the average shading mesh modified using the selected modification parameters, and wherein the total hue variance of the at least one cluster, $E_{x/y}$, for correcting the first color channel of the image is:

$$E_{x/y} = \sum_c^C \sum_i^N (x/y - \overline{x/y})^2$$

where c is a cluster of the at least one cluster, C is the total number of clusters in the at least one cluster, N is the number of pixels in blocks of the cluster c, i is a pixel of the blocks of the cluster c, x is the proportion of a first color in the pixel i, y is the proportion of a second color in the pixel i, and $\overline{x/y}$ is a ratio of the proportion of the first color to the proportion of the second color averaged over the pixels in the blocks of the cluster c.

7. The adaptive shading correction method of claim 6, wherein the first color is red or blue and the second color is green.

8. The adaptive shading correction method of claim 1, wherein the plurality of modification parameters comprises:
a vertical shift of the average shading mesh;
a horizontal shift of the average shading mesh; and
a scaling of the average shading mesh.

9. The adaptive shading correction method of claim 8, wherein at least one of:
the vertical shift is within a predetermined vertical search range;
the horizontal shift is within a predetermined horizontal search range; or
the scaling is within a predetermined scaling range.

10. The adaptive shading correction method of claim 1, wherein the modifying the average shading mesh comprises modifying the average shading mesh separately for each of a plurality of color channels.

11. The adaptive shading correction method of claim 1, comprising:
correcting a first color channel of the image using the average shading mesh to generate a first partly corrected image; and
applying the adaptive shading correction method to the first partly corrected image,
the identifying the modification parameters comprising identifying modification parameters for a second color channel of the first partly corrected image;
the modifying the average shading mesh comprising modifying the average shading mesh using the modification parameters for the second color channel of the first partly corrected image to generate the shading correction mesh;
the correcting the image for the lens shading comprising correcting the first color channel of the first partly corrected image for the lens shading using the shading correction mesh to generate a second partly corrected image,
the method further comprising:
correcting the first color channel of the second partly corrected image using a further best shading correction mesh generated for a third color channel to generate a third partly corrected image.

12. The adaptive shading correction method of claim 11, wherein the first color channel is green, the second color channel is red and the third color channel is blue.

13. The adaptive shading correction method of claim 1, wherein the correcting the image for the lens shading using the shading correction mesh comprises, for each of a plurality of pixels of the image, multiplying a pixel value of a pixel of the plurality of pixels with a respective value of an inverse of the shading correction mesh.

14. The adaptive shading correction method of claim 1, wherein the clustering comprises, for each hue-flat block of the hue-flat blocks:
determining a hue-flatness of other blocks in a spatial neighborhood of the hue-flat block;
in response to determining that none of the other blocks are hue-flat, assigning the hue-flat block to a new cluster;
in response to determining that solely one of the other blocks is hue-flat, assigning the hue-flat block to a same cluster as the one of the other blocks; and
in response to determining that more than one of the other blocks is hue-flat, assigning the hue-flat block to a cluster comprising one of the more than one of the other blocks in dependence on a comparison between an average hue variance of the hue-flat block and an average hue variance of each cluster comprising one of the more than one of the other blocks.

15. The adaptive shading correction method of claim 14, wherein the comparison comprises:
comparing an average r/g of the hue-flat block with an average r/g of the respective cluster; and
comparing an average b/g of the hue-flat block with an average b/g of the respective cluster,
where r is the proportion of red, g is the proportion of green, and b is the proportion of blue.

16. The adaptive shading correction method of claim 1, comprising pre-processing the image before the segmenting the image.

17. The adaptive shading correction method of claim 1, wherein the selected modification parameters are selected to minimize an error function based on a variance and a mean of the at least one cluster and a variance and a mean of regions of the average shading mesh as modified, each region of the regions corresponding with a cluster of the at least one cluster.

18. The adaptive shading correction method of claim 1, wherein the modifying the average shading mesh comprises interpolation of a variance and a mean of zones of the average shading mesh, each zone of the zones corresponding with a block of the plurality of blocks.

19. An image signal processor configured to perform an adaptive shading correction method for correcting an image for lens shading, the adaptive shading correction method comprising:

segmenting the image into a plurality of blocks of pixels;
    identifying hue-flat blocks of the plurality of blocks, the hue-flat blocks having a relatively low hue variance;
    clustering the hue-flat blocks into at least one cluster based on a spatial distribution of the hue-flat blocks;
    identifying selected modification parameters for modifying an average shading mesh by:
        modifying the average shading mesh along a plurality of dimensions using a plurality of modification parameters, different ones of the plurality of modification parameters corresponding to a respective different dimension of the plurality of dimensions, and
    processing the at least one cluster,
    so as to identify the selected modification parameters;
    modifying the average shading mesh using the selected modification parameters to generate a shading correction mesh; and
    correcting the image for the lens shading using the shading correction mesh.

20. The image signal processor of claim 19, comprising a field programmable gate array.

* * * * *